(12) United States Patent
Subasic et al.

(10) Patent No.: US 8,504,411 B1
(45) Date of Patent: Aug. 6, 2013

(54) SYSTEMS AND METHODS FOR ONLINE USER PROFILING AND SEGMENTATION

(75) Inventors: Pero Subasic, Mountain View, CA (US); Hans Marius Holtan, San Jose, CA (US); Robert S. Cabacungan, Haymarket, VA (US); Manu Shukla, Sterling, VA (US); Rohan A. Mehta, Mountain View, CA (US); Jay L. Chang, Potomac, MD (US); Kenin A. H. Coloma, Sunnyvale, CA (US); Neil Cohen, Oak Hill, VA (US); Brian Whitney, Reston, VA (US); Jaimyoung Kwon, Alameda, CA (US); Yan Qu, Cupertino, CA (US)

(73) Assignee: AOL Advertising Inc., Dulles, VA (US)

( * ) Notice: Subject to any disclaimer, the term of this patent is extended or adjusted under 35 U.S.C. 154(b) by 721 days.

(21) Appl. No.: 12/558,891

(22) Filed: Sep. 14, 2009

(51) Int. Cl.
*G06Q 30/00* (2012.01)
(52) U.S. Cl.
USPC ... 705/7.33; 705/7.29; 705/14.41; 705/14.53; 705/14.55; 707/734; 707/733
(58) Field of Classification Search
USPC .......................... 705/7.11–7.42, 14.1–14.73
See application file for complete search history.

(56) References Cited

U.S. PATENT DOCUMENTS

| | | | |
|---|---|---|---|
| 7,783,592 B2 * | 8/2010 | Armstrong et al. ........... | 715/751 |
| 2004/0215515 A1 | 10/2004 | Perry | |
| 2007/0067297 A1 | 3/2007 | Kublickis | |
| 2007/0067429 A1 | 3/2007 | Jain et al. | |
| 2007/0192194 A1 | 8/2007 | O'Donnell et al. | |
| 2007/0266002 A1 | 11/2007 | Chowdhury et al. | |
| 2008/0028334 A1 | 1/2008 | De Mes | |
| 2008/0059286 A1 | 3/2008 | Nickerson et al. | |
| 2008/0082399 A1 | 4/2008 | Noble et al. | |
| 2008/0189181 A1 | 8/2008 | Zorman et al. | |
| 2008/0209343 A1 | 8/2008 | Macadaan et al. | |
| 2008/0209350 A1 | 8/2008 | Sobotka et al. | |
| 2008/0220760 A1 | 9/2008 | Ullah | |
| 2008/0222283 A1 * | 9/2008 | Ertugrul et al. ............... | 709/224 |
| 2008/0249855 A1 | 10/2008 | Collins et al. | |
| 2008/0262901 A1 | 10/2008 | Banga et al. | |
| 2008/0262908 A1 | 10/2008 | Broady et al. | |
| 2008/0262925 A1 | 10/2008 | Kim et al. | |
| 2008/0263633 A1 | 10/2008 | Banga et al. | |
| 2008/0282186 A1 | 11/2008 | Basavaraju | |
| 2009/0248494 A1 * | 10/2009 | Hueter et al. ................... | 705/10 |
| 2010/0223105 A1 * | 9/2010 | Gassewitz et al. .............. | 705/10 |

* cited by examiner

*Primary Examiner* — David Rines
(74) *Attorney, Agent, or Firm* — Finnegan, Henderson, Farabow, Garrett & Dunner, LLP

(57) ABSTRACT

A computer-implemented method is provided for managing online user profiles. The method includes receiving information about online activity of a user, the information including at least a unique user ID and a URL requested by the user; fetching textual content associated with the URL requested by the user; generating one or more keywords based on the textual content; and generating or updating a user profile of the user to include the one or more keywords. A system for managing online user profiles is also provided.

20 Claims, 7 Drawing Sheets

```
2007-10-29  06:02:12, 700111, vd1900119363773200001,24.24.150.222,'http://msn.careerbuilder.com','dGBxSnQZNzjVNq9s1Y4oHA==','',
2007-10-29  06:02:12, 702547, vd1900119363773200014,70.190.139.177,'http://www.cheatcc.com/psx2','gpGf4MH/pvqQda09m93Ue+==','',
2007-10-29  06:02:14, 730934, vd1900119363773340013,75.71.108.67,'http://travel.comcast.net/flight','7XnaZvE8FDEORM8hrX/XoB==','',
2007-10-29  06:02:23, 737137, ve4500118657481200000,98.199.154.147,'http://www.apartments.com','GMqNK/vZMB97gMnfVgw8lB==','',
2007-10-29  06:02:25, 730028,cc240011875637870016,24.129.75.205,'http://www.tomshardware.com'>'QaJMqMkikilqir6+RaKz1+==','',
2007-10-29  06:02:34, 734297,vd1900119363775400003,72.191.10.24,'http://rentalhouses.com','1ehMiKhaaqTKC1ajHmZxU+==','',
2007-10-29  06:02:38, 734423ee6100119319644000034,69.235.22.207,'http://www.cardomain.com','E6SnBvZCpm/GE3p0tfmvr/==','',
2007-10-29  06:02:40, 702547,vf5200116933673200001,24.168.154.183,'http://www.cheatcc.com/psx2','gpGf4MH/pvqQda09m93Ue+==','',
```

(ACID, TIMESTAMP, URL, FREQ)

310

| ACID | TIMESTAMP | URL | FREQ |
|---|---|---|---|
| AA1200116783678890001 | 2007-10-29 | HTTP://WWW.CHOICEHOTELS.COM | 4 |
| AA1200116783678890001 | 2007-10-29 | HTTP://TRAVELA.PRICELINE.COM/HOTEL | 2 |
| AA1200116784449330029 | 2007-10-29 | HTTP://CAREERBUILDER.COM | 2 |
| AA1200116792870900014 | 2007-10-29 | HTTP://JOBS.MSN.CAREERBUILDER.COM | 1 |
| AA1200116793701600023 | 2007-10-29 | HTTP://JOBS.CAREERBUILDER.COM | 1 |

CAMPAIGN / NETWORK REACH SUMMARY DURING THE PERIOD:

| | CAMPAIGN | % OF | NETWORK | NOTE |
|---|---|---|---|---|
| VIEWERS | 213,391,700 | 39% | 552,157,800 | # OF VISITORS ARE NOT SAME AS # OF XXXXXX: MULTIPLIED BY 100 TO CORRECT FOR SAMPLING |
| CLICKERS | 505,256 | 2% | 24,448,195 | # OF CLICKERS ARE NOT SAME AS # CLICKS |
| ACTORS | 56,368 | 0% | 23,626,543 | # OF ACTORS ARE NOT SAME AS # OF ACTIONS; INCLUDE ALL ACTORS, NOT JUST OUR NETWORK |

("EXPORT TO EXCEL" BUTTON IS AT THE BOTTOM RIGHT CORNER OF THE TABLE)

| CLASS | CLASS NAME | FREQ VIEWERS | FREQ ALL VIEWERS | VIEW LIFT | FREQ CLICKERS | FREQ ALL CLICKERS | CLICK LIFT | FREQ ACTORS | FREQ ALL ACTORS | ACTION LIFT |
|---|---|---|---|---|---|---|---|---|---|---|
| 3333341 | TRAVEL | 3903[18.2%] | 6118[19.0%] | 95.3% | 1823[7.5%] | 90697[19.1%] | 39.5% | 208[2.6%] | 156868[25.1%] | 13.8% |
| 3333331 | CAREER | 4152[19.4%] | 5983[18.6%] | 104.2% | 1517[6.2%] | 72483[15.3%] | 33.6% | 208[2.6%] | 112574[18.0%] | 11.3% |
| 3333332 | EDUCATION | 3869[18.0%] | 5554[17.2%] | 104.6% | 1731[7.1%] | 80776[17.0%] | 41.3% | 208[2.6%] | 105525[16.9%] | 13.1% |
| 3333330 | AUTO | 3390[15.8%] | 5259[16.3%] | 96.8% | 1671[6.9%] | 69281[14.6%] | 42.1% | 208[2.6%] | 94133[15.1%] | 11.5% |
| 3333343 | WEDDING | 3989[18.5%] | 4790[14.9%] | 103.1% | 13589[56.0%] | 96819[30.4%] | 276.6% | 208[2.6%] | 11642[18.7%] | 573.8% |

*FIG. 6B*

SYSTEMS AND METHODS FOR ONLINE USER PROFILING AND SEGMENTATION

TECHNICAL FIELD

The embodiments of the present disclosure relate generally to online advertising. More specifically, the exemplary embodiments described herein relate to systems and methods for performing online user profiling and segmentation.

BACKGROUND

As greater numbers of people use the World Wide Web for communication, commerce, and other daily activities, they generate larger and larger volumes of traffic over the Internet. Because the benefits of commercializing the Internet can be tremendous, businesses increasingly take advantage of this traffic by advertising their products or services online. These advertisements may appear in the form of leased advertising space (e.g., "banners") on content websites, which are operated by "publishers" who control the website content and the availability and cost of the advertising space or "ad inventory."

Advertisers of various products or services may create online advertising campaigns that include advertisements designed to be placed on content websites during a specified period of time. For example, an automobile company may design several advertisements for a new model and may wish to have the advertisements placed online during a period surrounding the launch of the new model. Each time one of the advertisements is shown to a viewer of the website is known as an "impression." When shown the advertisement, the user may select, or "click," on the advertisement or may take another "action" such as completing an online form to request more information. If the user later purchases the new model of automobile, the purchase is referred to as a "conversion" of the impression. Advertisers may pay owners of content Web sites (i.e., the publishers) based on, for example, the number of impressions, clicks, or conversions over the course of an advertising campaign.

In some cases, an advertiser may have a marketing plan that identifies certain types of people as being target audience members for a given product or service. For example, the advertiser may wish to spend money only on users having certain demographics or personal interests. Alternatively, advertisers may be unsure of which people are most likely to respond to a given product, service, or advertisement. Therefore, advertisers may wish to obtain very specific information about the types of consumers viewing various types of web sites and responding to their advertisements. In some cases, advertisers may be willing to spend more money per impression, click, or conversion based on known information about those users interacting with the advertisements. As a result, publishers of content websites and/or facilitators of third party advertising networks may wish to obtain as much information as possible about consumers and other users traveling between web pages associated with an advertising network.

The present disclosure is directed to achieving one or more of the above-referenced goals by performing online user profiling and segmentation.

SUMMARY

In accordance with one disclosed exemplary embodiment, a method is provided for managing online user profiles. The method includes receiving information about online activity of a user, the information including at least a unique user ID and a URL requested by the user; fetching textual content associated with the URL requested by the user; generating one or more keywords based on the textual content; and generating or updating a user profile of the user to include the one or more keywords.

In accordance with another exemplary embodiment, a system is provided for managing online user profiles. The system includes a processor configured to: receive information about online activity of a user, the information including at least a unique user ID and a URL requested by the user; fetch textual content associated with the URL requested by the user; generate one or more keywords based on the textual content; and generate or update a user profile of the user to include the one or more keywords; and a memory configured to store one or more of the information, the textual content, the keywords, and the user profile.

In accordance with another exemplary embodiment, a computer-readable storage medium is provided for storing a computer program which, when executed by a computer, causes the computer to perform a method of online user profiles. The method includes receiving information about online activity of a user, the information including at least a unique user ID and a URL requested by the user; fetching textual content associated with the URL requested by the user; generating one or more keywords based on the textual content; and generating or updating a user profile of the user to include the one or more keywords.

BRIEF DESCRIPTION OF THE DRAWINGS

FIG. 3 depicts a screenshot of an exemplary selection of incoming user impression logs;

FIG. 6B depicts a further screenshot of an exemplary display output of online user segmentation.

DETAILED DESCRIPTION OF THE DRAWINGS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
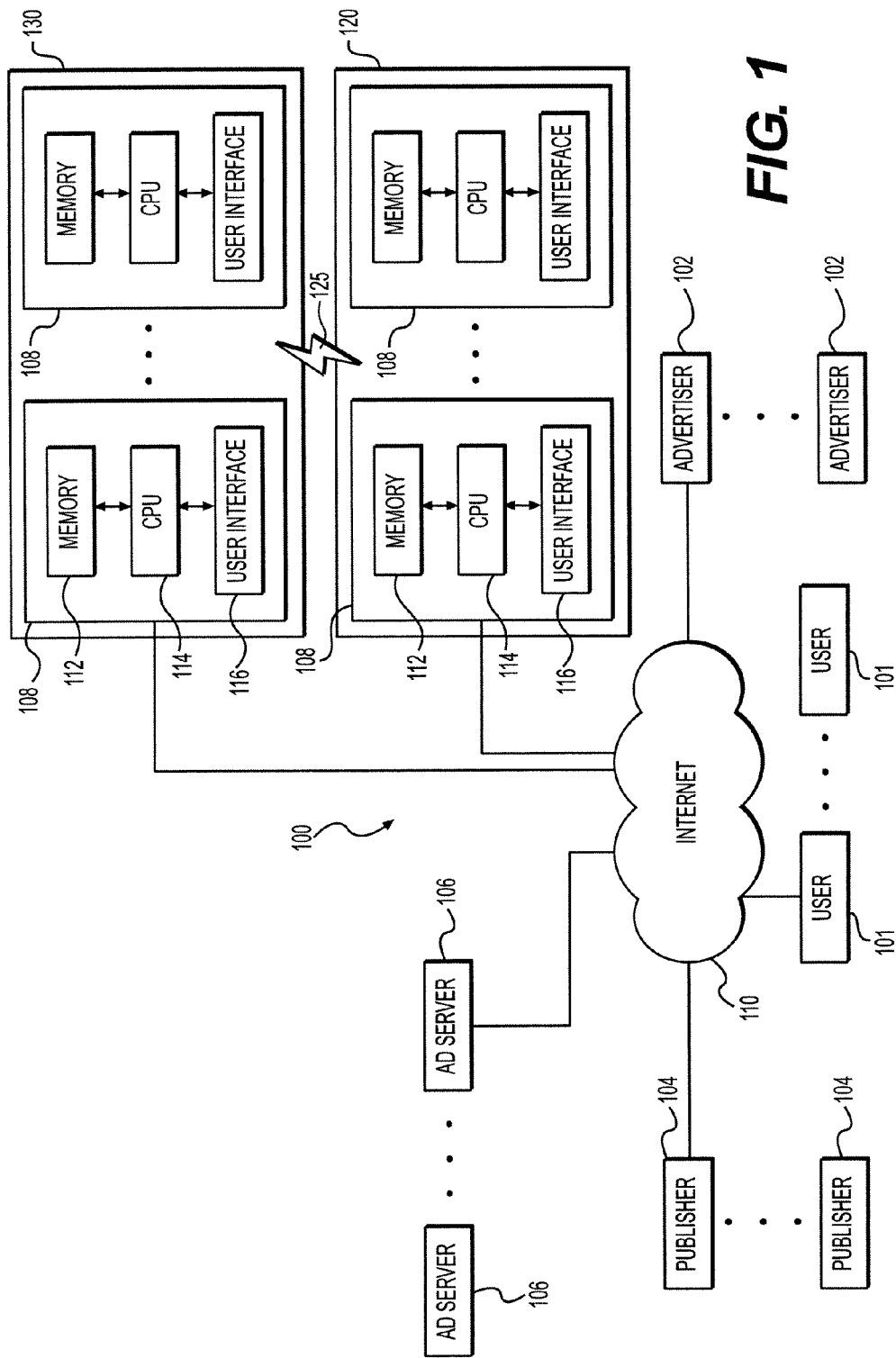
FIG. 1 depicts a block diagram of an exemplary system for performing online user profiling and segmentation.

FIG. 1 illustrates an exemplary system 100 for performing online user profiling and segmentation. System 100 may include a plurality of users 101, advertisers 102, publishers 104, ad servers 106, and machines 108, all disposed in communication with the Internet 110. As will be described in more detail below, in general, system 100 may be configured to create searchable contextual profiles for online users 101, and to perform segmentation of users 101 based on any desired factor, such as demographics, personal interests, etc.

Advertisers 102 may include any entities having online advertisements (e.g., banner ads, pop-ups, etc.) desired to be delivered to online users. For example, advertisers 102 may have created advertisements relating to products or services marketable to one or more online users. Advertisers 102 may interact with publishers 104, ad servers 106, and/or machines 108 through computers connected to the Internet 110. Thus, advertisers 102 may be able to communicate advertising campaign information, such as ad information, targeting information, consumer information, budget information, bidding information, etc., to other entities in system 100.

Publishers 104 may include any entities having inventories of available online advertising space. For example, publishers 104 may include online content providers, search engines, e-mail programs, or any other online site or program having online user traffic. Publishers 104 may interact with advertisers 102, ad servers 106, and/or machines 108 via computers connected to the Internet 110. Thus, publishers 104 may be able to communicate inventory information, such as site information, demographic information, cost information, etc., to other entities in system 100.

Ad servers 106 may include any type of servers configured to process advertising information from advertisers 102 and/or site information from publishers 104, either directly or indirectly. In certain embodiments, ad servers 106 may be remote web servers that receive advertising information from advertisers 102 and serve ads to be placed by publishers 104. Ad servers 106 may be configured to serve ads across various domains of publishers 104, for example, based on advertising information provided by advertisers 102. Ad servers 106 may also be configured to serve ads based on contextual targeting of web sites, search results, and/or user profile information. Ad servers 106 may be configured to generate behavioral logs, leadback logs, click logs, action logs, and impression logs, based on users' interactions with web sites and ads implemented by system 100.

The term "user," "customer," or "person," as used herein, may refer to any consumer, viewer, or visitor of a Web page or site and can also refer to the aggregation of individual customers into certain groupings. References to customers "viewing" ads is meant to include any presentation, whether visual, aural, or a combination thereof. As will be described in more detail below, a set of attributes may be associated with each user, in a searchable profile. The attributes may reflect the user's interests and incorporate characteristics that impact advertisement selection, purchasing, and other online behavior. Attributes may be created based on user data, such as impression history, click history, purchase history, demographic data, etc.

In the most general sense, the present methods may include (1) tracking and logging users' activities across an ad network of web sites, (2) obtaining and generating information about the web sites that users visit, (3) associating the logged activities and web site information with the profiles of users who visit the respective web sites, and (4) segmenting and analyzing users based on the data stored in their user profiles. In certain embodiments, advertisers, publishers, and/or ad network facilitators may assign a cookie and unique user ID to each computer identified as visiting a site in the ad network. So called "third party cookies" may allow tracking of a user across web sites in the ad network by identification of the assigned user ID. For example, cookies stored locally on a user's computer may be accessed to identify the user and to determine the last time that the user viewed the advertisement and/or a web page. In addition, in instances when a cookie is unavailable, a virtual cookie may be used. A virtual cookie may be derived from available information such as the user's IP address, browser type, geographic location, connection speed, or any other accessible and appropriate session level data. In certain embodiments, data may be obtained for each user, which represents the user's tendency to return to a specific web site in a given period of time. This data may be initially generated using estimated figures based on known user attributes. The estimated figures may be modified over time using user viewing logs. User viewing logs may be created by storing the viewing patterns of a user over an extended period of time.

The presently disclosed systems and methods are directed to creating a "user profile" structure for each user interacting with the network within a certain time frame (e.g., the last 24 hours). Each user profile may contain comprehensive, timely information about the user, including: (1) geographical information, such as country, province (US state), metro area, city, zip code, and/or Standard Industrial Classification (SIC); (2) demographic information (when available), such as age, gender, household income, marital status, homeowner status, age of household members, etc.; (3) user session information, such as type of internet connection, computer operating system, web browser type, language, user hour, etc.; (4) contextual information, including aggregated contextual profile of the user and/or visited URLs; and (5) user events and time-based information, i.e., the where, what, and when of page views, clicks, purchases, etc.

In order to perform such user profiling methods, machines 108 may include one or more computing systems configured to receive information from entities in system 100, process the information, and communicate the information with other entities in system 100, according to methods described herein. Machines 108 may include any type or combination of computing systems, such as clustered computing machines and/or servers. For example, as shown in the embodiment of FIG. 1, a plurality of machines 108 may form a large-scale storage (LSS) component 120. Another plurality of machines 108 may form a distributed caching (DC) component 130, which may be disposed in communication with LSS component 120 through a communication terminal or network 125.

In one embodiment, each machine 108 may be an assembly of hardware, including a memory 112, a central processing unit ("CPU") 114, and/or a user interface 116. Memory 112 may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. An optional user interface 116 may include any type or combination of input/output devices, such as a display monitor, keyboard, and/or mouse.

As shown in FIG. 1, large-scale storage (LSS) component 120 and distributed caching (DC) component 130 may interact with each other and with system 100 to create web page profiles and user profiles according to methods described herein. LSS component 120 and DC component 130 may also interact with each other and with system 100 to perform segmentation of users based on contextual user and web page information. In one embodiment, a plurality of software modules may operate on LSS component 120 and DC component 130 to perform user profiling and segmentation methods.

Update and Batch Processing Complex

Figure 2:
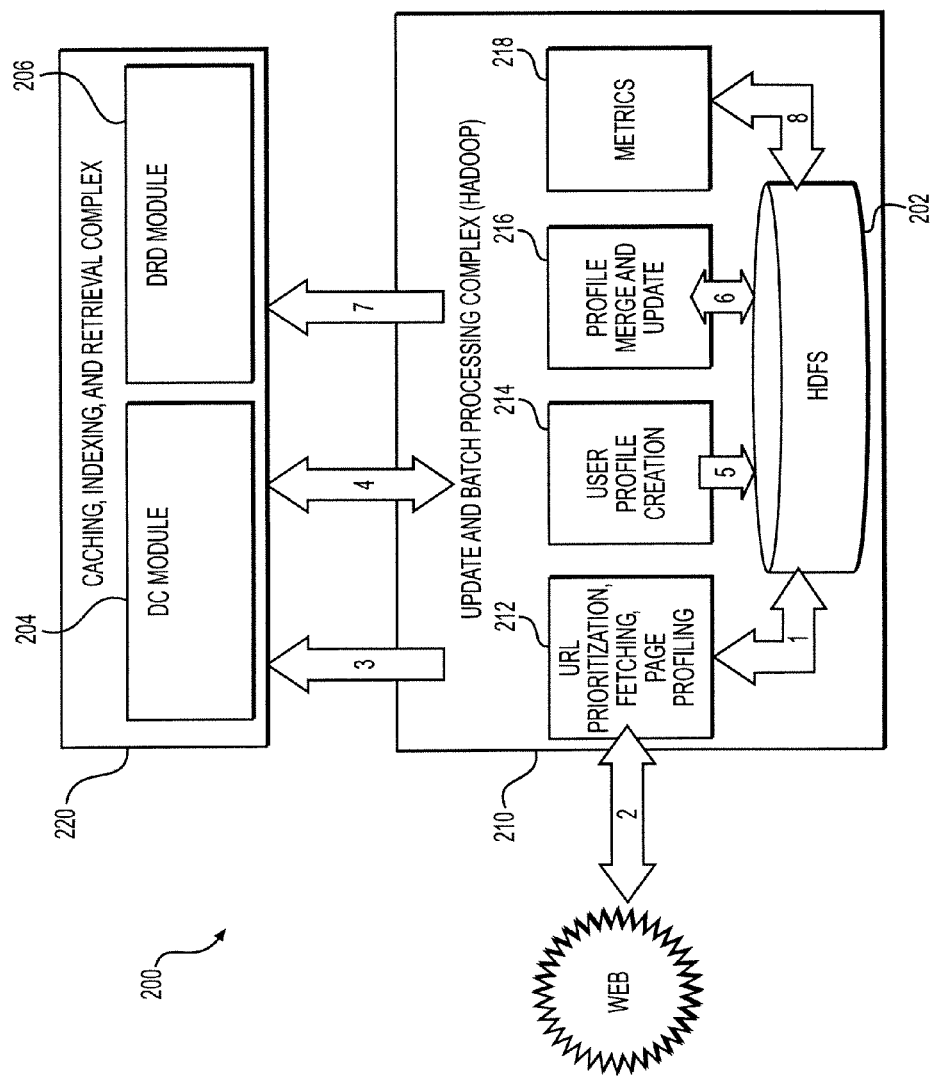
FIG. 2 depicts a block diagram of an exemplary system for performing online user profiling and segmentation.

FIG. 2 illustrates one exemplary embodiment of a plurality of software modules 200, which may operate across LSS component 120 and DC component 130 to perform user profiling and segmentation methods. For example, FIG. 2 generally depicts an update and batch processing complex 210 and a caching, indexing, and retrieval complex 220. In one exemplary embodiment, the update and batch processing complex 210 may operate with a Hadoop distributed file system (HDFS) 202 on LSS component 120. Meanwhile, the caching, indexing, and retrieval complex 220 may operate on DC component 130. The exemplary systems and methods disclosed herein will be described in reference to an embodiment in which the LSS component 120 may include 48 clustered machines 108, whereas the DC component 130 may include 4 clustered machines 108.

Of course, it will now be appreciated that components 120, 130 may include any desired number or arrangement of clustered machines 108, as needed to provide suitable efficiency, storage space, and/or processing power. In addition, although machines 108 are described with respect to LSS component 120 and DC component 130, it will be appreciated that any suitable configuration of processors and data storage devices may be selected to carry out methods described herein. In general, the hardware associated with machines 108 and system 100 may be selected to enable quick response to various business needs, relatively fast prototyping, and delivery of high-quality solutions and results. An emphasis may be placed on achieving high performance through scaling on a distributed architecture. The selected hardware may be flexible, to allow for quick reconfiguration, repurposing, and prototyping for research purposes. In addition, the data flows and processes described herein are merely exemplary, and may be reconfigured, merged, compartmentalized, and combined as desired. The exemplary modular architecture described herein may be desirable for performing data intensive user profiling and segmentation methods. Modular architecture may also be desired to enable efficient integration with external platforms, such as content analysis systems, various plug-ins and services, etc. Finally, the hardware and modular architecture may be provided with various system monitoring, reporting, and troubleshooting tools.

In one embodiment, Hadoop distributed file system ("HDFS") 202 of update and batch processing complex 210 may be configured to stage input data, and store large-volume data output. In some cases, the content of produced data objects stored in LSS component 120 may be synchronized to corresponding objects in other databases, such as databases operating on DC component 130. For example, as will be described in more detail below, HDFS 202 may be provided in communication with other modules operating on LSS component 120, such as a URL prioritization, fetching, & page profiling module 212, a user profile creation module 214, a profile merge and update module 216, and a metrics module 218. LSS component 120 may be used when large amounts of data are desired to be stored and processed in HDFS 202. Typical use scenarios may include large-scale data fetching and profiling (e.g., tens of millions of users, hundreds of millions of Web pages, etc.), archiving of various data (performance data, historical data from different systems, etc.), and staging large input data sets (event data, behavioral data), etc. Of course, LSS component 120 may be scaled out by incorporating additional machines to accommodate increasing numbers of users and web pages.

Caching, Indexing, and Retrieval Complex

As shown in the embodiment of FIG. 2, caching, indexing, and retrieval complex 220 may include a distributed cache (DC) module 204 and a distributed retrieval database (DRD) module 206. Generally, DC module 204 may be provided as a distributed cache or distributed in-memory database table. DC module 204 may be used where fast lookup is desired for medium sized data sets. DC module 204 may also be used as a communication channel for synchronizing and passing data between modules. DC module 204 may be a non-persistent cache, which may be used as transient data storage or a communication channel when there are no requirements on data persistency. For example, memcache may be a suitable distributed memory caching system. However, persistent cache may also, or alternatively, be used as transient data storage or communication channel when there are requirements on data persistency. For example, a MySQL cluster may be a suitable persistent caching system. Distributed cache may be selected based on other requirements, such as indexing. If a simple key-value, hash-table based lookup is desired, memcache may be a good candidate. If indexes on multiple columns or composite indexes are required, some other solution, e.g. MySQL Cluster, may be desired.

DRD module 206 may be implemented as a Solr/Tomcat database, or any other enterprise search server. For example, the DRD module 206 may include a contextual index, such as a Lucene/Solr distributed index, Sphinx distributed index, or Lemur/Indri distributed index. These components may be used for indexing of text content. Although not necessary, for performance reasons, it may be desired that the size of individual index shards is such that each shard can be stored in main memory on its node. The DRD module 206 may also be a distributed MySQL server (e.g., servers on multiple nodes used for partitioning or replication purposes). In one exemplary embodiment, the DRD module 206 may be a single-node MySQL server used to store medium-sized data sets for analysis, reporting/presentation, and other purposes. The data stored in such a server may be used to build an interface directed towards data consumers, data analysts, and/or business and sales entities. In one embodiment, DC and DRD modules 204, 206 may be implemented using the same software: for example, MySQL server may have part of the schema in in-memory tables, serving as a DC module, whereas the other part can be in disk-supported tables, serving as DRD module 206.

Thus, in one exemplary embodiment, a cluster of four machines 108 may be used to operate software modules of the caching, indexing, and retrieval complex 220, as follows: (1) all four machines may run a memcache distributed caching server, one memcached process per machine; (2) all four machines may run an instance of Tomcat, one instance per machine; (3) all four machines may run an instance of Solr search engine, one instance per machine; and (4) one machine may run a Web-based front-end site (such as a browser-based search application) for the submission of queries to Solr and the display of search results.

In one embodiment, the content of a user profile may be indexed for retrieval in a distributed Solr index of DRD module 206, while the user profile itself (i.e., browsing history, large-term and short-term contextual profile, etc.) may be stored in the HDFS 202 of LSS component 120. Accordingly, the update of a user profile stored in HDFS 202 may result in the corresponding update of its Solr index in DRD module 206.

In addition to the DC module 204 and DRD module 206, various flow modules may be incorporated in the system to implement and synchronize data flow between modules, as will be described in greater detail below. Examples of flow modules may include a fetcher, parser, indexer, segmenter, user grouping module, profile generator, and profile merger. Moreover, plug-in modules may be used to add value to personalization flows by adding more information to its basic elements, such as pages with content fetched from the Web, user profiles, basic elements, etc. Plug-in modules may use available information to infer, summarize, or conceptualize information and generate new features for downstream profiling processes. Plug-in modules may also serve to generate useful information related to system monitoring, reporting, and troubleshooting. Several exemplary plug-in modules are now described below.

Plug-in Modules

Content classifiers may use information in a contextual format, and produce classes (either a set or hierarchical tree) related to that information. For example, contextual classifiers may classify news documents to topics like sports, entertainment, leisure, business, etc. One example of a content classifier is a Wikipedia-based classifier, which uses the Wikipedia knowledge base to determine relationships and significance between various words and concepts.

Feature weighters and extractors may receive information, in contextual, numeric, or other form, and distinguish between more and less important features for the task at hand. In one embodiment, feature weighters and extractors may act as weighting algorithms, assigning different weights to input features. Often, feature weighters and extractors involve filtering based on some weight threshold to produce a reduced set of features for subsequent processing. Feature weighters and extractors may be used in combination with feature generators, either up- or downstream from feature weighters and extractors. One example of a feature extractor includes a "term merge and weighter" for user profiles, in which terms are weighted based on their position and element membership in the original file, their recency, their frequency in the original document, and their frequency in all documents for a single user. In some cases, feature weighters and extractors may filter out terms as being noise.

Feature generators may be used to produce new features based on available features. One example of a feature generator may include an inferred demographics plug-in that uses existing information about user segments, available element types, site visitations, etc., to predict certain demographic features, such as gender, age, etc. Such generated feature values may be used to enhance user profiles for which that information is not originally available. Another exemplary feature generator may include a time-based click counter for predictive modeling of action probability. For example, a time-based click counter may produce features that count the number of clicks for a given user within the past N hours on the network. This newly produced feature may be used (as one of many features) for predictive modeling of action probability for that user.

Filters may be used to filter out undesirable information for downstream processing. For example, content classified as 'spam', 'wow', '404 page', 'login page', etc., can be filtered out because it is of no interest for further processing. Filters may act at the level of other information objects. For example, a user profile may be filtered out if it does not contain enough information, if its information is deemed unreliable, or for similar reasons.

Meta-estimators may be used to provide the system with any information desired to complete its tasks. For example, a fetch-period estimator may estimate the lifetime of a content page between two fetches, or the time that can pass before re-fetching a page with a given URL. Another exemplary meta-estimator may include a scorer that scores documents in real time based on a combination of criteria, such as: the number of previous matches within the past N hours; the total matching score within the past K matches; the most recent number of impressions, etc. These scores may be used for document re-ordering in the next matching run, database maintenance in the case of resource constraints, and similar situations. Typically, information from meta-estimators may be returned to the database for further use by different services and processes.

External modules, including the above-described plug-ins may be used for miscellaneous tasks at different places in the pipeline. For example, a dedicated external service may be used for retrieving additional information for a given URL, such as: extracted document content, a set of content categories, extracted document features, etc. For example, the "Relegence" news feed is one suitable external module that may be used to accomplish these and similar tasks.

In addition, a reporting service may be used for reporting and monitoring system performance, by accessing information from live and archive databases. The reporting service may produce statistical summaries, charts, plain file tabular representations, database tables, Web pages, etc. For example, Statistica Data Miner may be used as a suitable monitoring and reporting tool. The reporting tool may be used to connect to the database table, and generate miscellaneous statistical information, charts and reports, for display on a screen. Another exemplary suitable reporting tool includes the Segmentation Lift Tool, an internal reporting tool that may be used for displaying various charts, tables, etc. that describe the response of various web populations to an advertiser's campaigns and products.

Finally, data analysis tools may be used for analyzing data produced by the various modular flows, for example, by connecting to the DRD module 206. Examples of such tools may include Statistica Data Miner and SAS Enterprise Miner. Data analysis tools may also include front-end reporting tools, such as PMT, various in-browser scripting and visualization tools, etc.

User Profiling Method

The above-described systems, software modules, plug-ins, and tools may be used to perform various exemplary user profiling methods. In particular, the exemplary LSS component 120 may be a shared resource of data and processing power for running map-reduce jobs. In general, map-reduce jobs may include: URL fetching and page profiling, user profile creation, user profile merge/update, and metrics collection. Initially, the method may include the step of receiving input data from various entities in system 100. For example, various data logs may be received from publishers 104 and/or ad servers 106, including: behavioral logs, leadback logs, click logs, action logs, and impression logs. FIG. 3 illustrates the exemplary receipt of raw incoming data from, e.g., impression, event, behavioral logs, having information such as a user ID, date and timestamp, URL, and frequency of visits. Of course, any additional action logs may be accepted, including proprietary logs from various ad-serving services, such as Tacoda, Quigo, and AOL/AdTech. Information from these and other input logs may be incorporated by using parsing adapters. For user profiling purposes, it may be desirable for all of the different logs to have a unique user ID that is either unique across all logs or mappable to other unique user IDs. In general, each of the logs may include one field with a user ID, and many additional fields with features describing properties of any event, such as a page view, click, or purchase. Many logs will also include a timestamp of the event, and possibly a referring URL. As discussed above, some of the data from inputted logs may be staged in the HDFS 202 operated on LSS component 120.

URL Fetching and Page Profiling

In one exemplary embodiment, contextual information about websites may be associated with the profiles of those users that visit those websites. In order to obtain contextual profiling of websites, the present method may employ a fetching algorithm to fetch and parse website HTML into keywords, and store the keywords in a cache. In one embodiment, websites may be processed for each domain in order to enforce a "courtesy" requirement, which limits the number of requests/seconds for any particular site. For example, in one embodiment, the fetching process may be separated into separate tasks, each of which is assigned to run on domains having different ranges of unique URLs. As a result, it may be ensured that sites with many unique URLs are processed first, and that tasks with multiple very large sites are not queued simultaneously.

In one embodiment, URL prioritization, fetching and page profiling module 212 may contain a plurality of fetching submodules designed to filter, group, prioritize, and analyze URLs to be fetched. First, a log processor submodule may be used to filter out records with invalid values, such as records with invalid URLs. A robots filter plug-in submodule may be used to prevent fetching of URLs as required by the target site's robots.txt exclusion file. A site-based grouping submodule may be used to group URLs by host, to allow enforcement of the courtesy policy described above. A prioritization submodule may be used to prioritize URL fetching based on impression count or any other criteria. A meta-estimator may be used to run in parallel with the fetching module and provide information about the re-fetching frequency desirable for each page/URL. In one embodiment, the re-fetch frequency may be adjusted based on estimated changes in page content.

Once all desired URLs have been fetched according to the above-described methods, a page profiling module may be used to associate contextual information with a profile for each URL. In one embodiment, the page profiler may contain submodules to parse, classify, extract, and cache the page content for use in page profiling. First, a page parser submodule may be used to parse the content of the HTML for each page. A content classifier may use the parsed content of the page to produce a set of classes/categories corresponding to that content. For example, a page may be classified as an "entertainment(movies)" page. Multiple categories, each having a certain weight, may be produced by this submodule. Categories may also be arranged in a hierarchy (e.g., with "movies" falling under the "entertainment" category). A content feature extractor may be used to extract certain features from fetched pages, such as the names of organizations, people, products, and other commercial entities, etc. A caching submodule may be used to store all elements of the page profile in a cache for later look-ups performed by the profile updater process. Cached page profile information may be used in the user profile creation process, as well as the updating and merging of user profiles.

User Profile Creation

User profile creation module 214 may be used to generate a user profile for each user found in the input logs within a given preceding time period. For example, in one embodiment, the inputs to user profile creation module 214 may include all log files obtained within the specific day (e.g., the past 24-hour period). In one embodiment, such new profiles may be created for each new update period (e.g., 24 hours), even for users already having cached profiles. The new profiles may then be merged/updated by updating any profiles already stored in HDFS 202 and DRD module 206 with the profiles from the most recent update period, as will be described in more detail below.

Figure 4:
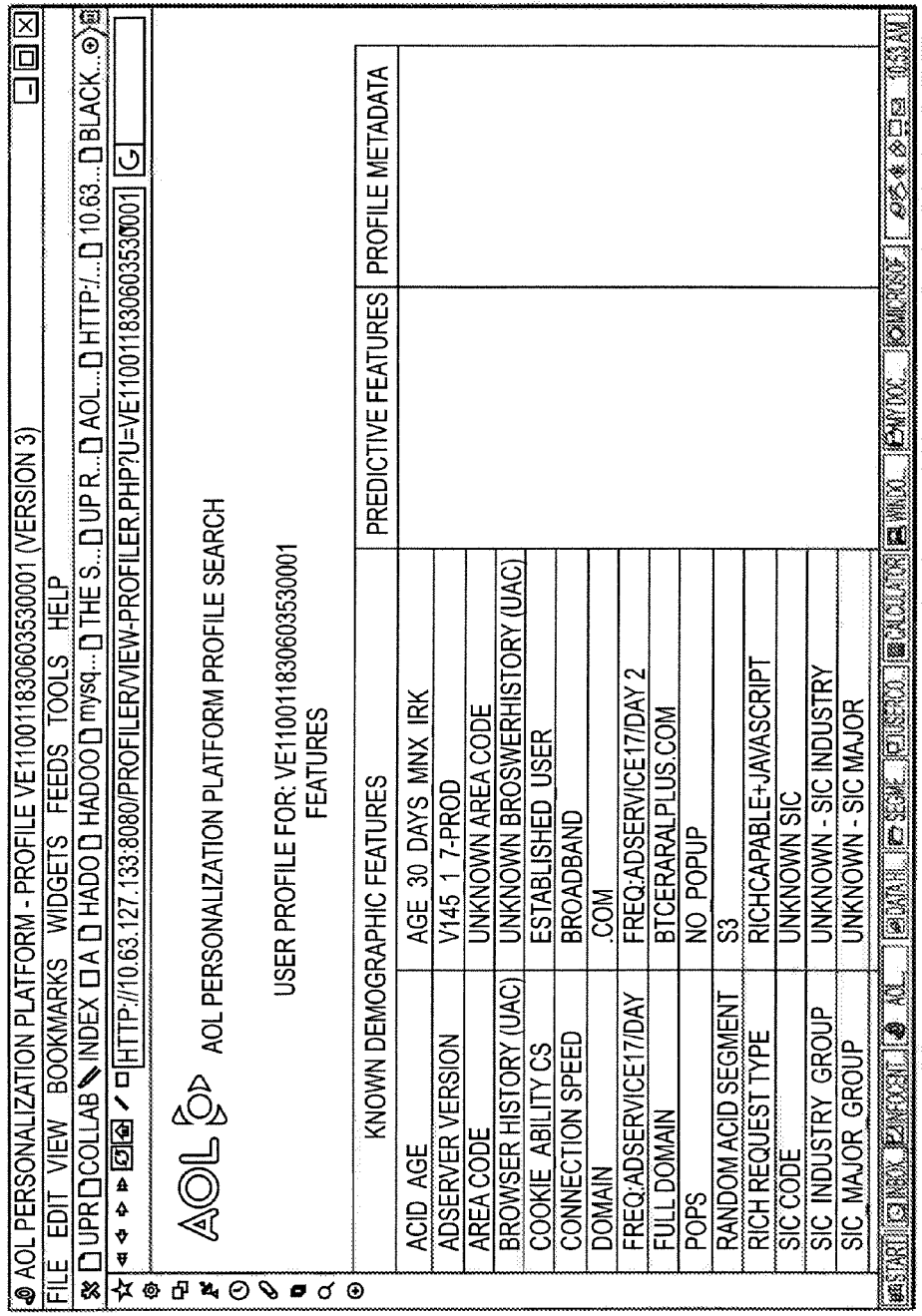
FIG. 4 depicts a screenshot of an exemplary user profile.

In order to create a user profile for each update period, module 214 may parse all available logs and merge all relevant element information from the different logs for each unique user ID (e.g., ACID). In addition, for URLs associated with the logged events, module 214 may search the cached contextual page profiles for the URLs, and add the weighted keywords from those page profiles to the user profiles of the users that visited the URLs within the update period. FIG. 4 depicts a screenshot of an exemplary user profile, which may contain all information aggregated from the various incoming logs. For example, the user profile may contain the user ID (ACID), geographical information, such as country, province (US state), metro area, city, zip code, and/or Standard Industrial Classification (SIC); demographic information (when available), such as age, gender, household income, marital status, homeowner status, age of household members, etc.; user session information, such as type of internet connection, computer operating system, web browser type, language, user hour, etc.; contextual information, including aggregated contextual profile of the user and/or visited URLs; and user events and time-based information, i.e., the where, what, and when of page views, clicks, purchases, etc. The resulting user profiles (each having an ACID and XML byte array of element types, values, and keywords with weights) may be stored in a profiles directory on HDFS 202.

Profile Merge and Update

Referring again to the exemplary modules of FIG. 2, profile merge and update module 216 may be used to combine new user profiles created by module 214 with those existing user profiles stored in the profiles directory on HDFS 202. After combining the profiles, the profiles directory may be overwritten. As described above, module 216 may merge profiles each time profiles are updated, or at any other desired interval.

Metrics

Metrics module 218 may be used to generate and record various metrics useful in monitoring the user profiling process. In one embodiment, metrics module 218 may obtain three datums from a current record, including: user ID (ACID), URL, and domain name of that URL, and emit the three records: URL, string "SITE:" and string "USER:" the values of which it may then count upwards each time a record is encountered. In other words, metrics module 218 may count the number of sites processed, the number of unique URLs processed, and the number of users profiled. Metrics may be stored on a daily basis, such that for each 24-hours worth of updates, there is one set of metrics files.

User Segmentation

Figure 5:
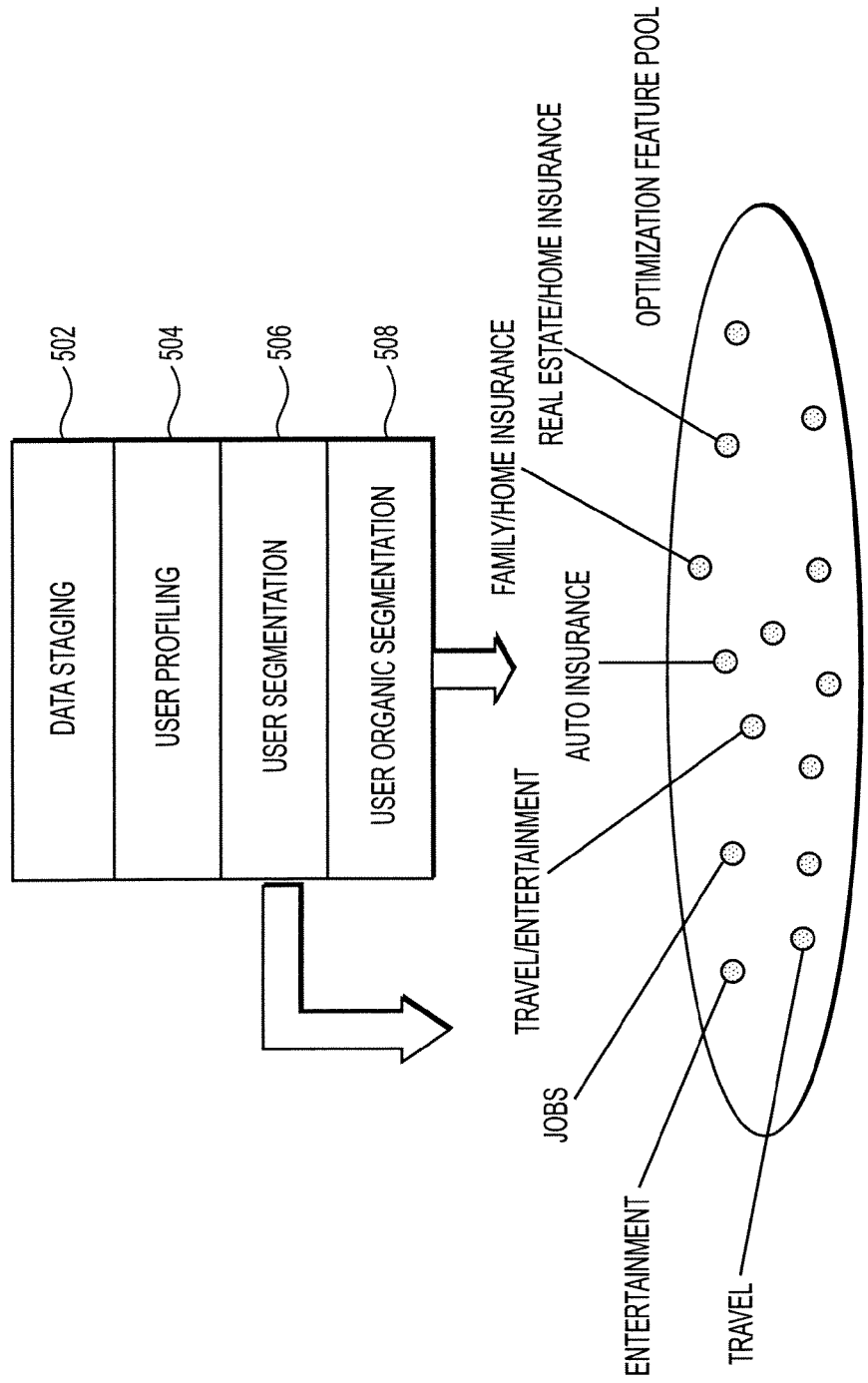
FIG. 5 depicts a block diagram of an exemplary method for performing online user segmentation.

The present disclosure also relates to the segmentation of users based on their user profiles and the contextual profiling of web pages associated with each user profile. Segmentation is a process by which a user population, represented by a database of user profiles, may be partitioned into groups called "segments" using one or more segmentation criteria. Segmentation of users will be described herein in relation to both "straight segmentation," which may involve manually constructed topics; and "organic segmentation" which may use advanced clustering and collaborative filtering algorithms to derive insights from relationships between various user segments. As shown in FIG. 5, once the above-described data staging methods 502, and user profiling methods 504 have been completed, it may be possible to perform user segmentation methods 506 and, optionally, organic segmentation methods 508.

Segmentation may be based on a group of features that characterize users. As shown in FIG. 5, manually constructed segment topics may include travel, entertainment, jobs, etc. Alternatively, a simple segmentation based on zip code may group all users from a given zip code into one segment. A more complex example may include multiple features: user groups formed by using zip code as well as a contextual match. In one embodiment, users from a particular zip code may be segmented by the content of their contextual profile in relation to contextual sub-segments such as entertainment, sports, auto, etc.

In one embodiment, "segment profiles" may be created and used in contextual segmentation to find user profiles with specific keywords. Due to the nature of contextual matching, it may be desirable to create segment profiles in order to find users that respond to certain keyword combinations. In some embodiments, segment profile creation may be a manual process, by which a segment profile is assigned a number of keywords that describe a certain contextual segment. For example, a travel segment profile might contain keywords like "travel," "tourism," "tourist," "leisure," etc. More complex forms of segment profiles may have weights attached to keywords, such that keywords which are more central to a concept described by the profile may have higher weights. In the travel segment profile example, weights could be assigned to individual keywords in the following way: travelˆ20, tourismˆ15, touristˆ15, leisureˆ10, etc. Even more complex segment profiles may be possible, with additional phrases and entities, such as products, places, etc.

Segment profiles may then be compared against existing user profiles. In one embodiment, for each segment profile, the content of the segment profile may be matched with the contextual part of the user database. The process may return the top N-scoring user IDs from the matching process sorted by score in descending order. A segment ID may then be assigned to the so obtained result set and stored to a user ID map for later reuse. Accordingly, this step may create mapping between segments and users. In the most general case, a user may belong to multiple segments. Also, users' matching scores may be a part of the produced mapping and can be used in the processing that follows after this step. Thus, segments may include sets of users with at least some common characteristics, which provides insights into properties of a segment as a whole; common properties of users within a segment; relationships with user properties of other segments; and the impact of various segments on performance metrics of the ad serving system.

More specifically, "intrinsic segment properties" may be determined by observing a segment as a set of user profiles, and analyzing common characteristics of users in that segment. As an example, it could be determined that users within a particular segment have visited a travel page within the past 24 hours, and that a great percentage of those users have also visited a news article on travel to California. These properties may be analyzed and observed on a segment-by-segment basis, for each segment separately, to determine the shared features/properties of users that characterize that segment.

Similarly, "comparative segment properties" may be determined by analyzing the properties that serve to distinguish between two or more segments. In this comparative context, users from two or more different segments may be compared to determine properties that are common/distinct for users in different segments. As another example, it could be determined that most users classified in travel and entertainment segments are from California. In yet another example, it could be discovered that users classified in the real estate segment tend to act on an ad campaign for a mortgage site in higher numbers than users from other segments.

It may also be possible to analyze segment content to automatically discover relationships between segments, create segment combinations, and find users with similar segment memberships. For example, in the case of contextual segmentation, cross-topic relationship discovery may be performed to obtain relationships, such as, for example, "Users that visit pages with luxury sports cars, also tend to visit pages about car insurance." Any suitable clustering tool may be used to analyze and compare segment content to generate relationship insights. In one exemplary embodiment, two clustering tools may be employed, including "Cluto" (of Karypis Lab, University of Minnesota) and "Fuzzy K Means" (of the Mahout open source project). Cluto may be used for small to medium sized data sets of up to several million users, while Fuzzy K Means may be scaled to 100s of millions users.

One exemplary method of clustering involves, in general, partitioning the user set into two subsets, such that the similarity between users in generated subsets is (suboptimally) maximal. The similarity may be based on user memberships in different segments. The subsets may be further partitioned until the desired number of user groups is generated. Various inter- and intra-cluster similarities may then be computed for the generated subsets. As in the case of plain segments, created user groups can be analyzed and/or targeted and used for optimization.

In certain embodiments, "segmentation lift reports" may be generated to represent the performance metrics of certain segments in comparison to the users of the overall ad network. The metrics may include viewer lift, clicker lift, and/or actor lift. The viewer lift may represent how much a given segment is exposed to the campaign ad compared to the general network population. Formally, $$\text{Viewer Lift of a segment} = \frac{P(\text{View a campaign ad} \mid \text{Person is in the segment})}{P(\text{View a campaign ad} \mid \text{Person is in the network})}$$

Clicker lift and actor lift may be defined similarly as follows:

$$\text{Clicker Lift of a segment} = \frac{P(\text{Click a campaign ad} \mid \text{Person is in the segment})}{P(\text{Click a campaign ad} \mid \text{Person is in the network})}$$
$$= \frac{\text{Clicker Rate in the segment}}{\text{Clicker Rate for the general population}}$$

$$\text{Actor Lift of a segmet} = \frac{P(\text{Act on the campaign} \mid \text{Person is in the segment})}{P(\text{Act on the campaign} \mid \text{Person is in the network})}$$
$$= \frac{\text{Actor Rate in the segment}}{\text{Actor Rate for the general population}}$$

where P(x) represents the probability of a view, click, or act of a person in the segment or network as indicated above, and the "lift" represents the ratio of the probability of that action for a person in the segment to that of a person in the network.

Figure 6A:
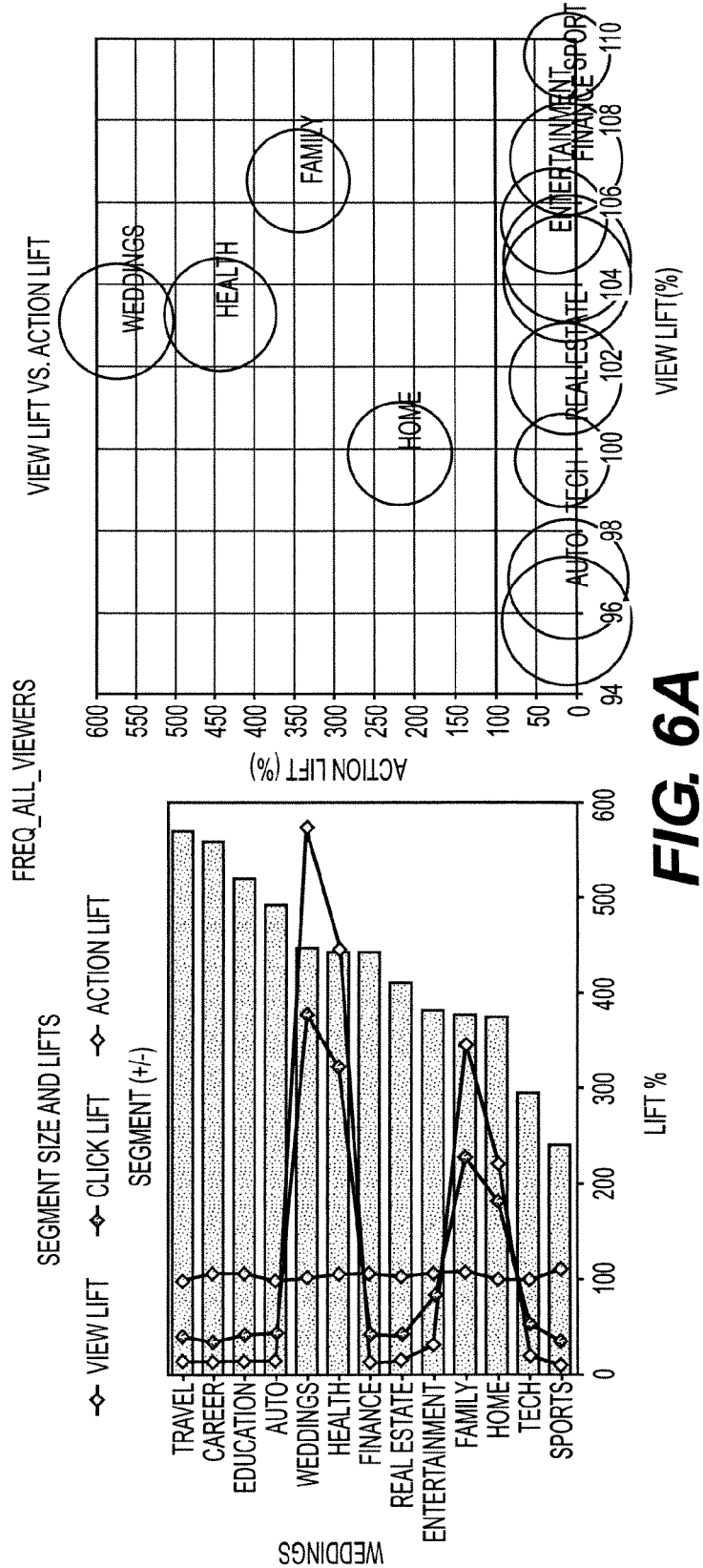
FIG. 6A depicts a screenshot of an exemplary display output of online user segmentation.

Practically, this information may be conveyed in the form of tables and graphs/charts, for example, as depicted in the exemplary charts and tables of FIGS. 6A and 6B. For instance, FIG. 6A depicts a screenshot of a segmentation analysis program for a particular advertiser, displaying segment size and lifts, and view lift vs. action lift data for a given time period. FIG. 6B depicts tables of campaign/network reach for a given period, as well as viewer, clicker, and actor frequency and lift for each segment. Of course, any available data may be selected and displayed in one or more charts, tables, and/or graphs to illustrate segmentation and lift data as desired.

If a segment has a viewer lift greater than 100%, it means the segment is more highly exposed to the campaign ad than the general population. In the example illustrated in the table below, a "teen" segment (first line of table) has a viewer lift of 111%, meaning that they are 11% more likely to see the campaign ad than the general population. Conversely, if a segment has a viewer lift of less than 100%, the segment is less exposed to the campaign ad than the general population. In the example illustrated in the table below, the "55-64" age segment has a viewer lift of 97%, meaning that they are 3% less likely to see the campaign ad than the general population.

Similarly, clicker lift of greater or less than 100% means the segment is more or less likely to click on the campaign ad than the general population. The same may apply to actor lift. In the example below, the "teen" segment may have a clicker lift of 198%, meaning the online users in the "teen" segment are 98% more likely to click on the given campaign than the general population. However, the "teen" segment may have an actor lift of 70%, which means that people in the "teen" segment are 30% less likely to act on the campaign than the general population. The table below represents a sample segmentation lift report for a campaign based on age segments.

One method of incorporating segmentation into the optimization process may include computing the bid value based on the yield of a particular segment. Because the circumstances of an advertising network may change rapidly, the process may be automated based on the following general steps: (1) creating segments; (2) computing main performance metrics of created segments, such as click through rate or conversion rate; (3) calculating the bid for each segment based on the performance metrics; (4) creating a user roster based on the computed bids; (5) running the advertising campaign using the roster; and (6) eventually re-creating the segments for another round of optimization/targeting. The time period for re-creating segments may be chosen to take into account changes in the network, such as active users, available content, campaign mix, short- and long-term seasonal impact, etc. In one embodiment, individual, high-performing segments may be selected for targeting, whereas poor-performing segments may be suppressed and not used for targeting at all. Such targeting or suppression may be applied to individual campaigns, group of campaigns (e.g. all campaigns for an advertiser), or individual sites or groups of sites.

| Segment | network population | % | campaign viewers | % | viewer lift | campaign clickers | % | clicker lift | campaign actors | % | actor lift |
|---|---|---|---|---|---|---|---|---|---|---|---|
| teen | 9,032 | 3 | 5,249 | 3.3 | 111 | 2,586 | 6 | 198 | 886 | 2.1 | 70 |
| 18-24 | 19,280 | 6.4 | 11,301 | 7.2 | 111 | 5,394 | 12.5 | 194 | 4,717 | 11.3 | 175 |
| 25-34 | 32,851 | 11 | 17,714 | 11.2 | 103 | 5,270 | 12.2 | 111 | 11,304 | 27 | 247 |
| 35-44 | 60,885 | 20.3 | 31,757 | 20.1 | 99 | 8,246 | 19 | 94 | 10,580 | 25.3 | 125 |
| 45-54 | 80,700 | 26.9 | 41,740 | 26.5 | 98 | 9,839 | 22.7 | 84 | 8,636 | 20.6 | 77 |
| 55-64 | 58,667 | 19.6 | 29,862 | 18.9 | 97 | 6,674 | 15.4 | 79 | 3,823 | 9.1 | 47 |
| 65plus | 38,481 | 12.8 | 20,124 | 12.8 | 99 | 5,291 | 12.2 | 95 | 1,901 | 4.5 | 35 |

This information on clicker and actor lift can be used to calculate bids specific to each user segment. Such segment-specific bids could then be submitted to a bidding optimization engine for optimization and targeting. User segments offer additional information to optimization engines by identifying high-performing user segments suitable for targeting and low-performing user segments that need to be avoided (negative targeting).

For instance, in a bidded marketplace for online advertising, an advertiser's bid may describe the target inventory of web pages for the advertising campaign as well as specify the maximum price per advertising request and the maximum request volume that an advertiser desires for the advertising campaign. Advertisers may pay whatever cost per thousand (CPM), cost per click (CPC), or cost per action (CPA) they want on the inventory of their choice. Moreover, advertisers can define budgets, pricing, targeting, and frequency caps, as well as segment-specific information.

Further, publishers may maintain segmentation and demographic data regarding the web pages containing the available inventory, demographic data that may include, for example, the percentage of impressions created for people within specified age brackets, within certain geographic regions, within defined income levels, or within certain segments. Publishers may include this information within each ad request sent to an advertiser or ad server/exchange, including a base price for the inventory on a web page, below which the publisher is unwilling to vend the inventory. An exchange may then facilitate the placement of advertisements from an advertiser onto cells provided by publishers by matching advertiser bids with publisher requests, based on segmentation information, among other factors.

Various changing factors may impact the output of user segmentation, including: (1) user focus changing due to different events; (2) seasonal events, such as sporting events, seasonal interests such as skiing in winter, presidential elections, major seasonal sales events, or random events; (3) long- and short-term temporal patterns, such as daily, weekly, monthly site visitation patterns differing for different sites; (4) bias in the data, e.g., from passing through ad serving optimization and not representing a "fair" sample of user activity; (5) campaign mixes changing as advertisers create and terminate multiple campaigns (e.g., more Ford campaigns would result in more users in the auto segment); (6) publisher and topic mix changing, as more publishers are added to the system, or removed, etc. on an hourly/daily basis; and (7) event sampling rate, publisher availability and noise in the data.

In some embodiments, it may be desirable to distinguish between short- and long-term user profiles. Short-term user profiles may collect and weigh terms from recently visited pages. For example, terms in user profiles may be weighted using a temporal decay function, such that more recently viewed terms are given higher weight. In one embodiment, short-term user profiles may contain terms collected within the last 30 days, whereas long-term profiles may contain terms collected between 30 and 90 days ago. Depending on the goal and scope of user profiling, these periods can be changed. For example, for some campaigns and advertisers 15 and 30 day time periods may be more appropriate. In another example, longer-term profiles (e.g., 3 months) may be more desirable to take into account seasonal interests and performance metrics across different user segments.

In addition to re-visiting web pages to build contextual user profiles based on the web content, it may also be possible to analyze sequences of user visits in relation to different properties to create user segments or other information of interest for performance analysis and reporting. For instance, in many cases, advertisers may be interested in the pattern of a user's behavior on the network or within a site. For example, a car company may be interested in what pages users typically visit immediately before they visit their site. Once they are on the car company's site, the company may be interested in users' navigation patterns, how likely are they to visit certain page or perform certain actions. The presently-disclosed user profiling platform may allow for such analysis based on URL information stored in the user profiles. The analysis can also be extended to other inventory on the Internet, such as RSS feeds, chats, emails, videos, etc. Sequence analysis of visits can also be used to generate additional features for segmentation, using the above-described feature generation plug-in. For example, the number of visits to a certain site within a given time period can be a feature used for segmentation.

Ad serving optimization is generally performed based on many static features for deciding what ads to serve to what user on a particular ad-serving position. Segmentation may be used to improve ad serving optimization, by adding new user profile information as input to the optimization process. For example, contextual segments, and relationships between segments and inferred features (e.g., demographic features like age, gender, etc.) may provide novel information to optimization processes. Depending on the optimization scenario, these features may be used in direct targeting by advertisers, or inputted directly to the optimization engine to improve the yield of a particular campaign. In the latter scenario, bidding amounts can be dynamically adjusted (based on predicted segment performance) and submitted to the bidding and optimization engine. In addition, segments may be created based on a combination of several existing features in a novel way such that the yield for a particular advertiser/campaign is increased. This process may be fully automated, since existing features may be combined by applying machine learning techniques, such as clustering and classification. Estimated performance of these created segments can be computed based on available data from server logs for the same or similar user population.

Accordingly, the present embodiments may advantageously provide scalable, flexible access to integrated information about visitors to the various products and services in advertising network 100. The embodiments may also display segment level information about web populations of interest to advertisers and publishers, as well as provide web populations that may be specially targeted for advertising. Moreover, the presently disclosed systems and methods may be used for segment evaluation prior to an advertiser actually committing to purchasing a targeting product offered in the advertising network.

Specifically, advertisers 102 may be provided with profile information for their customers, knowledge of how advertising affects different user segments, and knowledge of how sales can be improved through more effective advertising via user profiles and segmentation. Moreover, the above-referenced standard segmentation lift reports may be used to identify enterprise clients for custom insights and analytics, leveraging insights obtained from users across the network. Finally, users and/or user segments may be targeted and optimized based on profile information, thereby improving ad serving performance.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for managing online user profiles, the method comprising:
generating, by at least one processor, a prioritization table based on impression counts associated with a plurality of URLs;
retrieving, over an electronic network, textual data associated with the plurality of URLs, the retrieving being performed based on the prioritization table, such that URLs with higher impression counts have their textual content retrieved before URLs with lower impression counts;
generating, and storing in a database, one or more keywords in relation to each of the URLs, based on respective textual content retrieved for each of the URLs;
receiving information about online activity of a user, the information including at least a unique user ID and a URL requested by the user;
searching the database for one or more keywords stored in relation to the requested URL; and
generating or updating, by the at least one processor, a user profile of the user to include the one or more keywords stored in relation to the requested URL.

2. The method of claim 1, wherein the information further includes one or more of a timestamp, geographical information, demographic information, user session information, contextual information, and user events information.

3. The method of claim 1, wherein the information is received in the form of a behavioral log, a leadback log, a click log, an action log, or an impression log.

4. The method of claim 1, wherein the information is received from one or more of an advertiser of a product or service, a publisher of a web site, an ad server, or a third party facilitator of online advertising.

5. The method of claim 1, wherein a plurality of URLs are received, and the method further includes at least one of filtering out certain URLs, grouping URLs by host, and prioritizing URLs based on a number of Web pages associated with each host.

6. The method of claim 1, wherein the one or more keywords are generated by parsing HTML content associated with a URL and classifying the parsed content into categories.

7. The method of claim 1, further comprising the step of generating a page profile for a URL based on keywords generated for the URL.

8. The method of claim 1, further comprising adding weights to the keywords based on the textual content associated with the URL.

9. The method of claim 8, wherein the weights are added to the keywords based on their position and element membership on a web page of the URL, their recency, or their frequency in the web page.

10. The method of claim 1, wherein the user profile is generated or updated by aggregating any information received relating to the unique user ID.

11. The method of claim 1, wherein logs of online activity are received relating to a plurality users, and the method comprises generating, updating, and storing user profiles for each of the plurality of users in a directory.

12. The method of claim 10, further comprising partitioning the user profiles into segments based on content of the user profiles.

13. A system for managing online user profiles, the system comprising:
- a processor system configured to:
  - fetch, over an electronic network, textual data associated with a plurality of URLs, the fetching being performed according to a prioritization sequence based on impression counts, such that URLs with higher impression counts have their textual content fetched before URLs with lower impression counts;
  - generate, and store in a database system, one or more keywords in relation to each of the URLs, based on respective textual content fetched for each of the URLs;
  - receive information about online activity of a user, the information including at least a unique user ID and a URL requested by the user;
  - search the database for one or more keywords stored in relation to the requested URL; and
  - generate or update a user profile of the user to include the one or more keywords stored in relation to the requested URL; and
- a database system configured to store one or more of the information, the textual content, the keywords, and the user profile.

14. The system of claim 13, wherein logs of online activity are received relating to a plurality of users, and the method comprises generating, updating, and storing user profiles for each of the plurality of users in a directory stored in the database system.

15. The system of claim 14, wherein the processor is further configured to partition the user profiles into segments based on content of the user profiles.

16. The system of claim 13, wherein the processor is further configured to generate a page profile for a URL based on keywords generated for the URL; and store the page profile in the database system.

17. The system of claim 13, further comprising a plurality of clustered processors and memory devices.

18. The system of claim 13, wherein the system is disposed in communication with a plurality of ad servers through a network.

19. The system of claim 13, wherein the system further includes a user interface.

20. A computer-readable storage medium storing a computer program which, when executed by a computer, causes the computer to perform a method of online user profiles, the method comprising:
- fetching, over an electronic network, textual data associated with a plurality of URLs, the fetching being performed according to a prioritization sequence based on impression counts, such that URLs with higher impression counts have their textual content fetched before URLs with lower impression counts;
- generating, and storing in a database, one or more keywords in relation to each of the URLs, based on respective textual content fetched for each of the URLs;
- receiving information about online activity of a user, the information including at least a unique user ID and a URL requested by the user;
- searching the database for one or more keywords stored in relation to the requested URL; and
- generating or updating, using at least one processor, a user profile of the user to include the one or more keywords stored in relation to the requested URL.

* * * * *